United States Patent
Ozonat et al.

(10) Patent No.: US 9,704,136 B2
(45) Date of Patent: Jul. 11, 2017

(54) IDENTIFYING SUBSETS OF SIGNIFIERS TO ANALYZE

(71) Applicant: Hewlett-Packard Development Company, L.P., Houston, TX (US)

(72) Inventors: Mehmet Kivanc Ozonat, San Jose, CA (US); Claudio Bartolini, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 532 days.

(21) Appl. No.: 13/755,836

(22) Filed: Jan. 31, 2013

(65) Prior Publication Data

US 2014/0215054 A1 Jul. 31, 2014

(51) Int. Cl.
  *G06F 15/173* (2006.01)
  *G06Q 10/10* (2012.01)

(52) U.S. Cl.
  CPC .................. *G06Q 10/101* (2013.01)

(58) Field of Classification Search
  CPC ....... H04L 43/0876; G06F 11/00; G06F 17/00
  USPC .......................... 709/217, 219, 224; 715/517
  See application file for complete search history.

(56) References Cited

U.S. PATENT DOCUMENTS

| | | |
|---|---|---|
| 6,345,126 B1 * | 2/2002 | Vishwanath et al. ......... 382/253 |
| 6,519,580 B1 * | 2/2003 | Johnson et al. ................ 706/47 |
| 6,947,923 B2 | 9/2005 | Cha et al. |
| 6,950,827 B2 | 9/2005 | Jung |
| 7,072,883 B2 | 7/2006 | Potok et al. |
| 7,103,580 B1 | 9/2006 | Batachia et al. |
| 7,296,001 B1 | 11/2007 | Ephrati et al. |
| 7,433,841 B2 | 10/2008 | Byde et al. |
| 7,562,002 B2 | 7/2009 | Rzevski et al. |
| 7,596,552 B2 * | 9/2009 | Levy ................. G06F 17/30722 |
| 7,644,052 B1 * | 1/2010 | Chang et al. ................... 706/45 |
| 7,693,683 B2 | 4/2010 | Ihara |
| 7,823,055 B2 | 10/2010 | Sull et al. |
| 8,103,614 B2 | 1/2012 | Tseng et al. |
| 2004/0064303 A1 * | 4/2004 | Bangalore ............ G06K 9/6282 704/1 |
| 2005/0078017 A1 * | 4/2005 | Gergely et al. ................. 341/51 |
| 2006/0074980 A1 | 4/2006 | Sarkar |
| 2006/0288275 A1 * | 12/2006 | Chidlovskii et al. ......... 715/513 |
| 2007/0168856 A1 * | 7/2007 | Berkner ............ G06F 17/30716 715/210 |
| 2007/0250476 A1 * | 10/2007 | Krasnik ............ G06F 17/30327 |
| 2008/0133479 A1 | 6/2008 | Zelevinsky et al. |

(Continued)

OTHER PUBLICATIONS

Cao, Mukun., "Multi-strategy Selection Supported Automated Negotiation System Based on BDI Agent," 2012 45th Hawaii International Conference on System Sciences, Jan. 4-7, 2012, pp. 638-647.

(Continued)

*Primary Examiner* — Duyen Doan

(57) ABSTRACT

Identifying a subset of signifiers to analyze can include determining a set of distance metrics between a first signifier and each of a plurality of second signifiers, identifying a subset of the plurality of second signifiers to analyze based on the set of distance metrics using a computing device, and determining a relation between the subset of the plurality of second signifiers and the first signifier based a subset of the set of distance metrics.

18 Claims, 4 Drawing Sheets

(56) References Cited

U.S. PATENT DOCUMENTS

| | | | | |
|---|---|---|---|---|
| 2009/0281895 | A1* | 11/2009 | Selinger | G06Q 30/02 705/14.43 |
| 2009/0313173 | A1 | 12/2009 | Singh et al. | |
| 2010/0198841 | A1 | 8/2010 | Parker et al. | |
| 2011/0029513 | A1* | 2/2011 | Morris | 707/728 |
| 2011/0082859 | A1* | 4/2011 | Deng et al. | 707/728 |
| 2012/0045132 | A1* | 2/2012 | Wong et al. | 382/195 |
| 2012/0078612 | A1 | 3/2012 | Kandekar et al. | |
| 2012/0102037 | A1* | 4/2012 | Ozonat | G06F 17/30675 707/738 |
| 2012/0288015 | A1* | 11/2012 | Zhang | H04N 7/54 375/240.26 |
| 2014/0149106 | A1* | 5/2014 | Beretta | G06F 17/273 704/9 |

OTHER PUBLICATIONS

Hasan, et al., "Approximate Semantic Matching of Heterogeneous Events," The 6th ACM International Conference on Distributed Event-Based Systems, Jul. 16-20, 2012, Berlin, Germany, 12 pages.

Krapac, et al., "Learning Tree-structured Descriptor Quantizers for Image Categorization," Retrieved from http://hal.inria.fr/docs/00/61/31/18/PDF/paper.pdf, Aug. 2011, 11 pages.

Menczer, Filippo., "Combining Link and Content Analysis to Estimate Semantic Similarity," The 13th International World Wide Web Conference, May 17-22, 2004, New York, NY, 2 pages.

Caro, et al., "Using tagFlake for Condensing Navigable Tag Hierarchies from Tag Clouds," The 14th ACM SIGKDD International Conference on Knowledge Discovery and Data Mining, Aug. 24-27, 2008, Las Vegas, NV, USA, pp. 1069-1072.

Begelman, et al., "Automated Tag Clustering: Improving search and exploration in the tag space," Retrieved from http://tagging.pui.ch/automated_tag_clustering/, May 2006, 11 pages.

Russell, et al., "A grammar-based distance metric enables fast and accurate clustering of large sets of 16s sequences," BMC Bioinformatics 2010, Retrieved from http://digitalcommons.unl.edu/cgi/viewcontent.cgi?article=1189&context=electricalengineeringfacpub, Dec. 17, 2010, 14 pages.

Faratin, et al., "Negotiation Decision Functions for Autonomous Agents," Department of Electronic Engineering, Queen Mary and Westfield College, University of London, London, UK, Oct. 22, 1997, 38 pages.

Fatima, et al., "Multi-Issue Negotiation Under Time Constraints," Proceedings of the ACM First International Joint Conference on Autonomous Agents and Multiagent Systems, AAMAS 2002, Jul. 15-19, 2002, Bologna, Italy, 8 pages.

Fatima, et al., "An Agenda Based Framework for Multi-Issue Negotiation," Department of Computer Science, University of Liverpool, Liverpool, UK, Mar. 28, 2003, 50 pages.

Coehoorn, et al, "Learning an Opponent's Preferences to Make Effective Multi-Issue Negotiation Trade-Offs," Proceedings of the 6th International Conference on Electronic Commerce, Delft, The Netherlands, Oct. 25-27, 2004, 10 pages.

Ito, et al., "Multi-Issue Negotiation Protocol for Agents: Exploring nonlinear utility spaces," Proceedings of the 20th International Joint Conference on Artificial Intelligence, Jan. 6-12, 2007, Hyderabad, India, 6 pages.

Van Kleef, et al., "The Interpersonal Effects of Anger and Happiness in Negotiations," Journal of Personality and Social Psychology, vol. 86, No. 1, Jan. 2004, pp. 57-76.

Van Kleef, et al., "The Interpersonal Effects of Emotions in Negotiations: A Motivated Information Processing Approach", Feb. 13, 2003, 30 pages.

Vetschera, Rudolf., "Preference structures and negotiator behavior in electronic negotiations", Decision Support Systems, vol. 44, Mar. 28, 2007, pp. 135-146.

Yukl., Gary A., "Effects of Situational Variables and Opponent Concessions on a Bargainer's Perception, Aspirations, and Concessions", Journal of Personality and Social Psychology, vol. 29, No. 2, May 1974, pp. 227-236.

* cited by examiner

IDENTIFYING SUBSETS OF SIGNIFIERS TO ANALYZE

BACKGROUND

Enterprises, such as companies and/or organizations, can move workloads from a centrally hosted and managed center to network systems by offering users (e.g., employees or customers) services over the network. A service, as used herein, can include an intangible commodity offer to users of a network. Such services can include computing resources (e.g., storage, memory, processing resources) and/or computer-readable instructions (e.g., programs).

DETAILED DESCRIPTION

Figure 1:
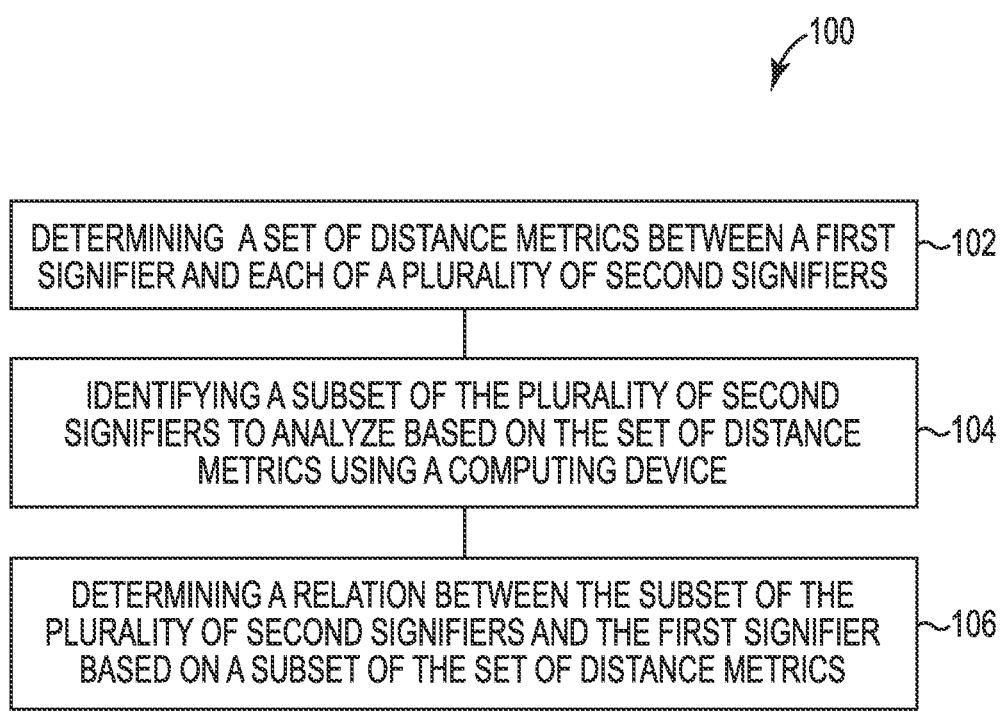
FIG. 1 is a block diagram illustrating an example of a method for identifying a subset of signifiers to analyze according to the present disclosure.

An enterprise may use an enterprise network, such as a cloud system and/or Internet network, to distribute workloads. An enterprise network, as used herein, can include a network system to offer services to users of the enterprise (e.g., employees and/or customers). A user may benefit from another user's experience with a particular service. However, due to the distributed nature of an enterprise network, users may have difficulty in sharing knowledge, such as services experiences.

In some situations, an enterprise may use an enterprise communication network to assist users of an enterprise network in sharing knowledge, learning from other users' services experiences, and searching for content relevant to the enterprise and/or the enterprise network. The enterprise communication network, as used herein, can include an electronic communication network to connect users of the network to relevant content. Users of the enterprise communication network can contribute to the enterprise communication network through a range of activities such as posting service-related entries, linking entries to content available on internal and external domains, reading comments, commenting on comments, and/or voting on users' entries. Thereby, the enterprise communication network can act as a social network associated with the enterprise, services offered by the enterprise, and/or documents associated with the enterprise, among other topics.

The range of activities that users can contribute to an enterprise communication network can result in the enterprise communication network containing unstructured content. Due to the unstructured nature of the content, a general purpose search engine may not properly function to allow users to search for content in the enterprise communication network. General purpose search engines may utilize measures such as back-links and/or clicks to define a quality and reputation of searched content. In an enterprise communication network, the quality and reputations of content may not be proportional to the number of back-links and/or clicks.

Content within the enterprise communication network can be identified by automatically learning semantics of signifiers within the enterprise communication network and/or the enterprise network. The signifiers can be identified by gathering content using a search tool and extracting signifiers from the gathered content. A relatedness of the identified signifiers can be defined by calculating a distance metric between pairs of signifiers. Using the defined distance metric, a semantics graph can be built that identifies the proximity of relations between the signifiers. A semantics graph can assist in tagging and searching for content within the enterprise communication network.

However, building a semantics graph can be time-consuming when a repository of content (e.g., plurality of signifiers) is to be analyzed. For example, the larger the repository, the longer it takes to analyze. As an example, new content added (e.g., new document, new domain, and/or new content added to an existing document and/or domain) to an enterprise network and/or enterprise communication network can result in identification of a new signifier that may not have existed in the repository previously. Rebuilding the semantics graph to include the new signifier can be time-consuming.

In contrast, in a number of examples of the present disclosure, a subset of existing signifiers (e.g., signifiers in an existing semantics graph) can be determined, so that analytics can be applied to the subset (e.g., rather than the entire set of existing signifiers), while maintaining target (e.g., desired) analytics results. By reducing the content analyzed (e.g., number of signifiers), analysis time to determine a relation of a new signifier can be reduced to a target time period (e.g., near real-time).

Examples of the present disclosure may include methods, systems, and computer-readable and executable instructions and/or logic. An example method for identifying a subset of signifiers to analyze can include determining a set of distance metrics between a first signifier and each of a plurality of second signifiers, identifying a subset of the second signifiers to analyze based on the set of distance metrics using a computing device, and determining a relation between the subset of the plurality second signifiers and the first signifier based on a subset of the set of distance metrics.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. Elements shown in the various examples herein can be added, exchanged, and/or eliminated so as to provide a number of additional examples of the present disclosure.

In addition, the proportion and the relative scale of the elements provided in the figures are intended to illustrate the examples of the present disclosure, and should not be taken in a limiting sense. As used herein, the designator "D" particularly with respect to reference numerals in the drawings, indicates that a number of the particular feature so designated can be included with a number of examples of the present disclosure. Also, as used herein, "a number of" an element and/or feature can refer to one or more of such elements and/or features.

FIG. 1 is a block diagram illustrating an example of a method 100 for identifying a subset of signifiers to analyze according to the present disclosure. Identifying a subset of signifiers to analyze can include, for example, identifying a subset of a plurality of second signifiers to analyze for a relation to the first signifier. The subset can be analyzed, instead of the entire repository (e.g., the plurality of signifiers), for example, resulting in target (e.g., desired) analytics results within a particular target timeframe. For instance, the method 100 can be used to determine a relation of the first signifier to a repository of signifiers in near real-time.

At 102, the method can include determining (e.g., calculating) a set of distance metrics between the first signifier and each of a plurality of second signifiers. A first signifier can include a new signifier. A signifier, as used herein, can include a word, phrase, and/or acronym within the content of the enterprise network and/or enterprise communication network. A new signifier, as used herein, can include a signifier that exists on the enterprise network and/or enterprise communication network but has not yet been analyzed (e.g., a new signifier does not exist in a semantics graph built for the enterprise communication network). A plurality of second signifiers can include a plurality of existing signifiers. An existing signifier, as used herein, can include a signifier that has been previously analyzed (e.g., an existing signifier exists in a semantics graph built for the enterprise communication network).

The plurality of second signifiers can be stored, for instance, in a repository. A repository can include a source storage system. For example, a repository can include a file and/or shared directory containing the plurality of second signifiers. A first signifier, in various examples, can be gathered from the enterprise network and/or the enterprise communication network. For instance, the first signifier can be gather using search tools, (e.g., web crawlers) as discussed further herein.

A distance metric, as used herein, can include a measurement of a relationship between pairs of signifiers. The measurement can be defined, in various examples, based on a frequency of co-occurrences of a pair of signifiers. A distance metric, for example, can include a numerical score calculated that represents the proximity of relation between a pair of signifiers. For instance, determining the distance metric can include calculating a weighted Euclidean distance including constructing an n-dimensional feature vector. A Euclidean distance can include an ordinary distance (e.g., numerical description of a distance) between two points. The distance metric can be based on a plurality of criteria to construct the n-dimensional feature vector. Such criteria can be based on a frequency of co-occurrences of the pair of signifiers in the enterprise network and/or the enterprise communication network. Examples of co-occurrences can include the pair of signifiers in the same list, table, paragraph, and/or linked content (e.g., domains), among other co-occurrences.

In some examples of the present disclosure, the new signifier can be identified by crawling an enterprise network and/or enterprise communication network for content. The content can include web links, publications, emails, and/or forums, among others. In a number of examples, the enterprise network and/or enterprise communication network can be crawled using a search tool. A search tool, for example, may scan a number of Internet domains, a number of web links, and/or a network, among others, and extract content (e.g., data). A search tool, as used herein, can be hardware components and/or computer-readable medium components such as a web crawler, a web spider, and/or other probe that continually and/or periodically scans the webpage, web link, network, etc. to collect content. The search tool may scan a number of Internet domains, web links, networks, etc. in an orderly, automated manner, and collect content. A search tool can include computer-readable instructions executed by a processor to crawl a number of Internet domains, for example.

At 104, the method can include identifying a subset of the plurality of second signifiers to analyze based on the set of distance metrics using a computing device. The subset of the plurality of second signifiers can include the most relevant second signifiers to the first signifier, and can allow for analysis of the subset in a particular target timeframe (e.g., near real-time).

A data tree-based model can be used to increase (e.g., maximize) an accuracy of identifying a subset of the plurality of second signifiers to analyze. A data tree can include a number of nodes connected to form a number of node paths, wherein one of the nodes is designated as a root node. A root node can include, for example, a topmost node in the tree. Each individual node within the number of nodes can represent a data point. The number of node paths can show a relationship between the number of nodes. For example, two nodes that are directly connected (e.g., connected with no nodes between the two nodes) can have a closer relationship compared to two nodes that are not directly connected (e.g., connected with a number of nodes connected between the two nodes).

The subset of the plurality of second signifiers can include a cluster of second signifiers and the identified first signifier. For instance, utilizing a data tree-based model, the plurality of second signifiers and the first signifier can be grouped into a plurality of clusters based on a cost function and the set of distance metrics calculated. A cost function, as used herein, can include two linear functionals representing a linear sum of components in each terminal node of a tree (e.g., as discussed further herein). In various examples, the cost function can be utilized to analyze the relationship between the plurality of second signifiers and the first signifier. For instance, determining a particular cost function to use can depend on the distance metric calculated (e.g., what considerations and/or calculations are made to determine the distance metric between pairs of signifiers) and/or how close signifiers are in the English language. The determined cost function may have an increasing functional and a decreasing functional, as discussed below.

In an example of the present disclosure, a tree-based problem can be formulated within a Breiman, Friedman, Olshen and Stone (BFOS) frame-work (e.g., model). The BFOS model can call for each tree to have two functionals (e.g., the cost function). The cost function can include a first component (e.g., the first tree functional) monotonically decreasing and a second component (e.g., the second tree functional) monotonically increasing. This can be referred to as tree-splitting. Toward this end, a quadratic discriminate analysis (QDA) distortion of any subtree of the fully-grown tree can be viewed as a sum of two tree functionals, $u_1$ and $u_2$, such that $u_1$ is monotonically decreasing, and $u_2$ is monotonically increasing. An example of the sum of two tree functions (e.g., a cost function) can include:

$$u_1 = \Sigma(\text{distance from center of node})^2 \quad (1)$$

$$u_2 = \Sigma \text{number of nodes} \quad (2)$$

where the square distance from center of the node can include the squared sum of a distance from the center of the node to each member of the node (e.g., center to each signifier within a cluster of signifiers). The number of nodes can include the number of nodes associated with a tree and/or subtree. For example, a smaller value of $u_1$ can indicate a higher relevance of signifiers as compared to a larger value of $u_1$. A smaller value of $u_2$ can indicate a smaller rate portion of the QDA distance and a smaller amount of content (e.g., signifiers) needed for analysis, as compared to a larger value of $u_2$. In various examples, the cost function can include a Gauss mixture cost function.

The functionals $u_1$ and $u_2$ are linear, as each can be represented as a linear sum of its components in each terminal node of the tree. The monotonic decrease of $u_1$ can be due to a minimization using the Lloyd model as will be further described herein, while the monotonic increase of $u_2$ can follow Jensen's inequality and convexity (e.g., relating a value of a convex function of an integral to the integral of the convex function).

In a number of examples, the tree splitting can be followed by pruning (e.g., removing a section of a tree) based on the BFOS model. By the linearity and monotonicity of the tree functionals (1) and (2), the target (e.g., optimal) subtrees to be pruned are nested, and at each pruning iteration, a selected target subtree can be one that minimizes the sum of (1) and (2). For instance:

$$\sum_i u_1 + \sum_i u_2, \quad (3)$$

at the point $$r = -\frac{\delta u_2}{\delta u_1}, \quad (4)$$

where $\delta u_i$, i=1,2, is the change of the tree functional $u_i$ from the current subtree to the pruned subtree of the current subtree and r is a ratio used to determine when to stop pruning a tree, for example. In some instances, r can include a change of $u_1$ divided by a change of $u_2$. The magnitude of this ratio r can increase at each iteration. Pruning can be terminated when the magnitude of this ratio r (e.g., normalized ratio) reaches $\lambda$, resulting in the subtree minimizing:

$$\sum_i u_1 + \sum_i \lambda u_2$$

Thereby, a determination to terminate pruning the number of subtrees can based on a ratio of the cost function. For instance, using the example of (1) and (2), resulting subtree minimizing can be denoted as:

$$\sum_i (\text{distance from center of node})^2 + \sum_i \lambda(\text{number of nodes}). \quad (5)$$

At 106, the method can include determining a relation between the first signifier and the subset of the plurality of second signifiers based on a subset of the set of distance metrics. A relation between the first signifier and the subset of the plurality of second signifiers can include calculating an average of the distance metric between the first signifier and each of the subset of second signifiers.

Figure 2A:
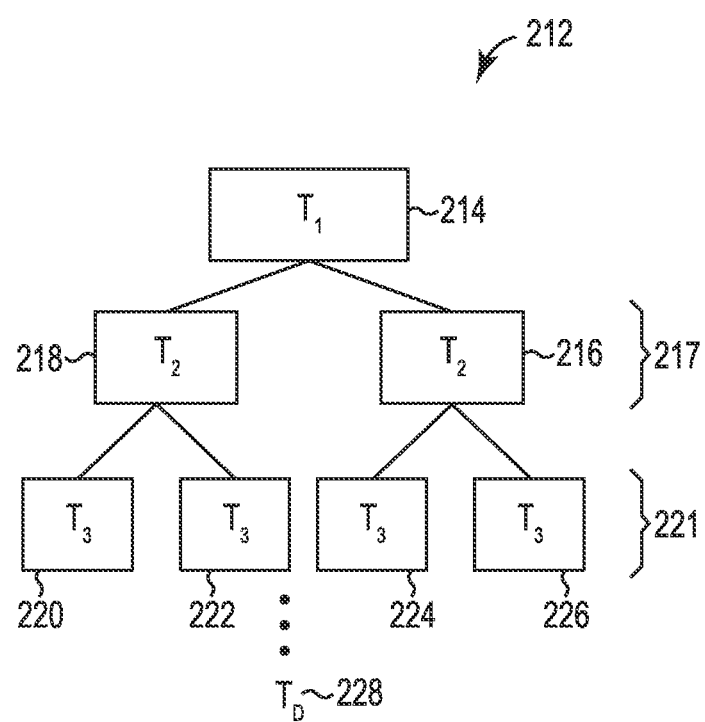
FIG. 2A is an example of a data tree structure according to the present disclosure.

FIG. 2A is an example of a data tree structure 212 according to the present disclosure. FIG. 2A illustrates, for example, how signifiers (e.g., existing signifiers and new signifiers) can be clustered using a data tree structure (e.g. growing a data tree structure). Data tree structure 212 can start with a single node tree 214, called $T_1$, out of which two child nodes 216 and 218 are grown. The single node tree 214 can contain the plurality of second signifiers and the first signifier. The Lloyd model (e.g., grouping data points into a given number of categories) can be applied between these two child nodes 216 and 218, minimizing the monotonically decreasing functional of the cost function (e.g., $u_1$), and this new tree 217 can be denoted as $T_2$. Each terminal node of $T_2$ can be split. Two pairs of child nodes can be obtained (e.g., pair 220 and 222 and pair 224 and 226), and the Lloyd model can be applied between each pair, minimizing the monotonically decreasing functional of the cost function to obtain $T_3$ 221. This procedure of splitting a tree, $T_i$, to obtain $T_{i+1}$ and running the Lloyd model between pairs of the child nodes can be repeated until i=D, (e.g., tree $T_D$ at 228) where D meets and/or exceeds a target threshold (e.g., D is sufficiently large).

The data tree structure 212, as illustrated in FIG. 2A, can include the plurality of second signifiers and the first signifier grouped into a plurality of clusters 214, 218, 216, 220, 222, 224, 226, 228 based on the cost function and the set of distance metrics. The clusters can be formed utilizing a data tree model. For example, the data tree model can include a tree-structured Gauss mixture vector quantization (e.g., a Lloyd-based Gauss mixture clustering function). Each terminal node 228 of the data tree structure 212 can include a cluster of signifiers. A terminal node (e.g., 228), as used herein, can include a node of a data tree structure (e.g., 212) that has no child node. For instance, a cluster of signifiers at a terminal node 228 can include phrases (e.g., multiple words) that are related to each other.

Figure 2B:
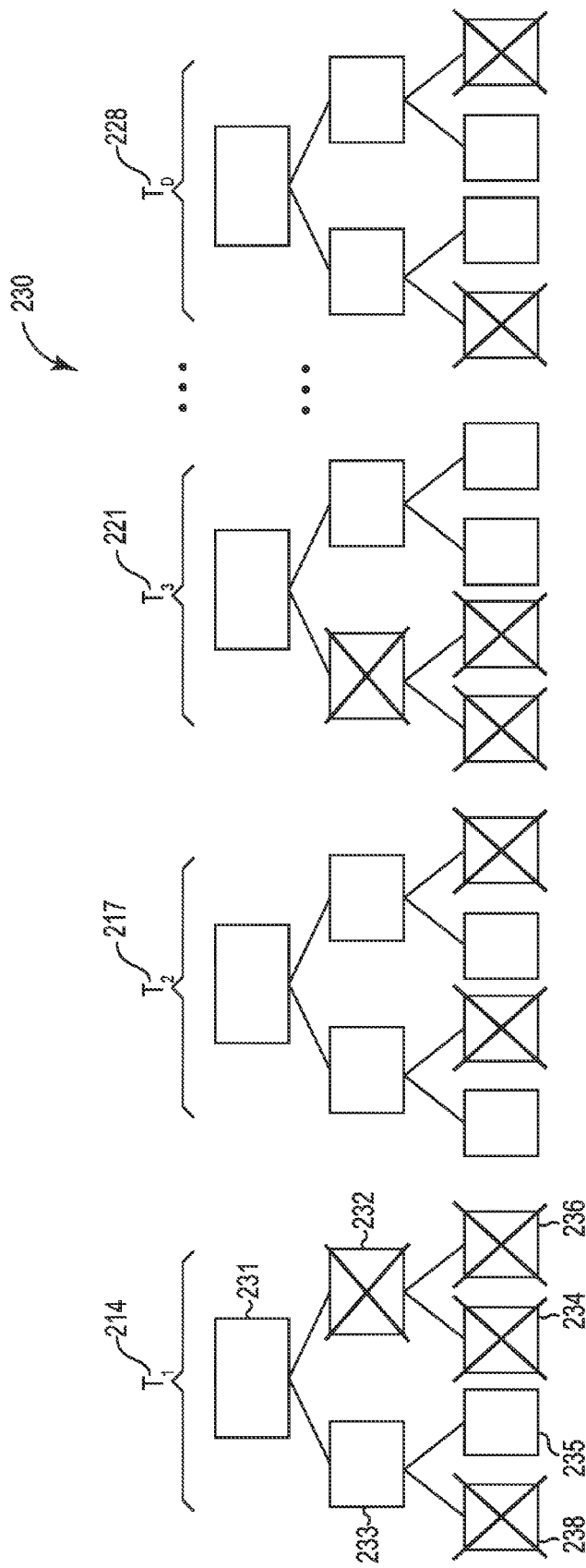
FIG. 2B is an example of a set of data tree structures according to the present disclosure.

In a number of examples of the present disclosure, following the tree-growing, a set of fully-grown trees can be formed (e.g., a set of all subtrees within an overall tree). FIG. 2B is an example of a set 230 of data tree structures (e.g., fully-grown trees) according to the present disclosure. Set 230 can consist of D trees, $T_i$, (e.g., trees 214, 217, 221 . . . 228) where $1 \le i \le D$. Each of the D trees, $T_i$, where $1 \le i \le D$, can be pruned using the BFOS model, and for each $T_i$, pruning can be stopped when the magnitude of r (after a normalization) reaches $\lambda$. For example, for each $T_i$, where $1 \le i \le D$, the subtree that minimizes the QDA distortion can be obtained. These subtrees can be target subtrees in the sense that the subtrees can minimize the QDA distortion. The subtrees can be denoted as $P_i$, where $1 \le i \le D$. The target subtree P can be selected as the subtree that minimizes the magnitude of r, resulting in a least amount of content (e.g., signifiers) that can be analyzed within a target timeframe, while still maintaining target (e.g., satisfactory, desired, etc.) analysis results.

In the example illustrated in FIG. 2B, nodes (e.g., signifiers and/or clusters of signifiers) that are covered with an "X" are pruned nodes, while other non-covered nodes are relevant, non-pruned nodes. For example, nodes 232, 234, 236, and 238 of tree 214 are pruned, while nodes 231, 233, and 235 are relevant, non-pruned nodes. Pruned nodes (e.g., 232, 234, 236, and 238) can include subtrees of irrelevant content (e.g., irrelevant second signifiers) to the first signifier.

The identified subset of second signifiers can, for instance, include a cluster of signifiers including the identified first signifier. Thereby, the identified subset of second signifiers can include a cluster of signifiers that the identified first signifier belongs to. Such a cluster can, in various examples, include a terminal node. In some examples, a first signifier can belong to multiple clusters and/or multiple terminal nodes.

In response to identifying a subset of second signifiers to analyze (e.g., identifying a cluster of signifiers the first signifier belongs to), a relation between the subset of the second signifiers and the first signifier can be determined based on a subset of the distance metrics. The subset of distance metrics can include the distance metrics between signifiers of the cluster (e.g., the distance metrics between the signifiers in the cluster). For instance, the average of the distance metrics between signifiers (e.g., the subset of the plurality of second signifiers and the first signifier) in the cluster can include an approximate relation of the first signifier with the second signifiers in the cluster. The approximate relation can include a measurement of a relation of related phrases (e.g., multiple signifiers) in the cluster.

The data tree structures illustrated in FIGS. 2A-2B (e.g., 212 and 230) are graphical representations of information of data tree structures. However, "a data tree structure," as used herein, does not require that a physical or graphical representation of the information actually exists. Rather, such a graph 212, 230 can be represented as a data tree structure in a tangible medium (e.g., in memory of a computing device). Nevertheless, reference and discussion herein may be made to the graphical representation, which can help the reader to visualize and understand a number of examples of the present disclosure.

Figure 3:
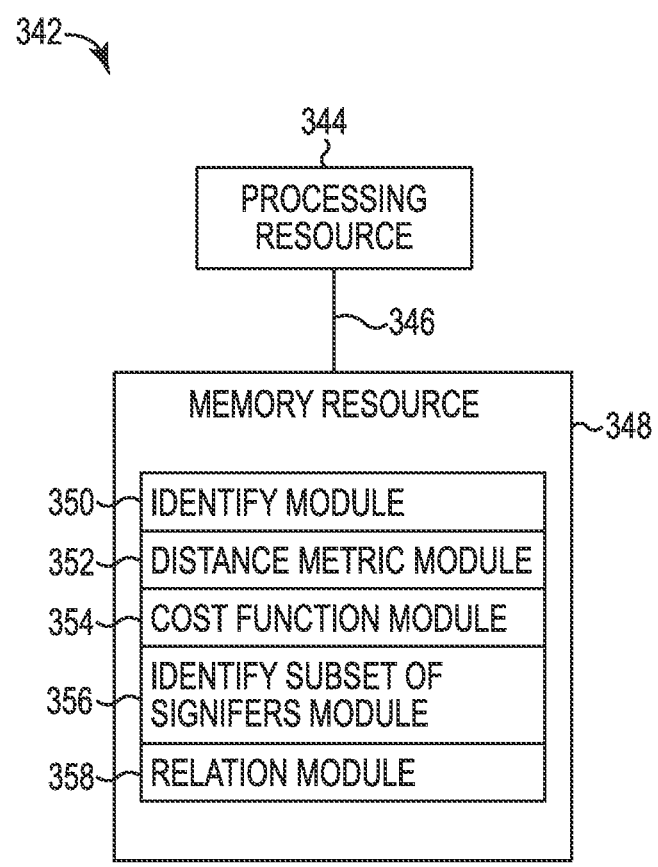
FIG. 3 illustrates a block diagram of an example of a system according to the present disclosure.

FIG. 3 illustrates a block diagram of an example of a system 342 according to the present disclosure. The system 342 can utilize software, hardware, firmware, and/or logic to perform a number of functions.

The system 342 can be any combination of hardware and program instructions configured to identify a subset of a plurality of signifiers to analyze based on a set of calculated distance metrics and a cost function utilizing a data tree model. The hardware, for example, can include a processing resource 344, a memory resource 348, and/or computer-readable medium (CRM) (e.g., machine readable medium (MRM), database, etc.) A processing resource 344, as used herein, can include any number of processors capable of executing instructions stored by a memory resource 348. Processing resource 344 may be integrated in a single device or distributed across devices. The program instructions (e.g., computer-readable instructions (CRI)) can include instructions stored on the memory resource 348 and executable by the processing resource 344 to implement a desired function (e.g., identify a new signifier associated with content on an enterprise network, etc.).

The memory resource 348 can be in communication with a processing resource 344. A memory resource 348, as used herein, can include any number of memory components capable of storing instructions that can be executed by processing resource 344. Such memory resource 348 can be a non-transitory CRM. Memory resource 348 may be integrated in a single device or distributed across devices. Further, memory resource 348 may be fully or partially integrated in the same device as processing resource 344 or it may be separate but accessible to that device and processing resource 344. Thus, it is noted that the system 342 may be implemented on a user and/or a client device, on a server device and/or a collection of server devices, and/or on a combination of the user device and the server device and/or devices.

The processing resource 344 can be in communication with a memory resource 348 storing a set of CRI executable by the processing resource 344, as described herein. The CRI can also be stored in remote memory managed by a server and represent an installation package that can be downloaded, installed, and executed. The system 342 can include memory resource 348, and the processing resource 344 can be coupled to the memory resource 348.

Processing resource 344 can execute CRI that can be stored on an internal or external memory resource 348. The processing resource 324 can execute CRI to perform various functions, including the functions described with respect to FIG. 1 and FIG. 2. For example, the processing resource 344 can execute CRI to identify a subset of the plurality of second signifiers to analyze.

The CRI can include a number of modules 350, 352, 354, 356, 358. The number of modules 350, 352, 354, 356, 358 can include CRI that when executed by the processing resource 344 can perform a number of functions.

The number of modules 350, 352, 354, 356, 358 can be sub-modules of other modules. For example, the cost function module 354 and the identify subset of signifiers module 356 can be sub-modules and/or contained within the same computing device. In another example, the number of modules 350, 352, 354, 356, 358 can comprise individual modules at separate and distinct locations (e.g., CRM, etc.).

An identify module 350 can include CRI that when executed by the processing resource 344 can provide a number of identification functions. The identify module 350 can identify a new signifier (e.g., a first signifier) associated with content on an enterprise network.

In various examples of the present disclosure, the system 342 can include a search module (not illustrated in the example of FIG. 3). The search module can include CRI that when executed by the processing resource 344 can provide a number of search functions. The search module can search the enterprise network and/or the enterprise communication network for content (e.g., documents, signifiers, and/or other relevant data). The content searched for by the search module can be used to extract the new signifier from new content, for instance.

As an example, the identify module 350 in various examples can include instructions to compare new content crawled (e.g., searched) and signifiers extracted from the new content to a repository of existing signifiers (e.g., second signifiers). In response to identifying a signifier crawled and extracted is different (e.g., unique) from the existing signifiers in the repository, the identify module 350 can identify the signifier as a new signifier.

A distance metric module 352 can include CRI that when executed by the processing resource 344 can perform a number of distance metric functions. The distance metric module 342 can determine a set of distance metrics between the new signifier and each of the plurality of existing signifiers. Determining, as used herein, can include calculating a distance metric.

A cost function module 354 can include CRI that when executed by the processing resource 344 can perform a number of cost function functions. The cost function module 354 can identify a cost function to analyze a relation between the plurality of existing signifiers and the new signifier. The relation analyzed can include a relatedness of phrases (e.g., multiple signifiers) associated with the enterprise communication network (e.g., phrases including the existing signifiers and the new signifier). Phrases associated with the enterprise communication network can include phrases gathered from the enterprise communication network and/or the enterprise network.

An identify subset of signifiers module 356 can include CRI that when executed by the processing resource 344 can perform a number identification functions. The identify subset of signifiers module 356 can identify a subset of the plurality of existing signifiers to analyze based on the set of distance metrics and the cost function utilizing a data tree model.

In some examples, the identify subset of signifies module 356 can include instructions to utilize a data tree model including instructions to grow a number of trees of relevant signifiers (e.g., including existing signifiers and the new signifier), split the number of trees into a number of subtrees, and prune the number of subtrees to include the subset of the existing signifiers to analyze. For instance, the instructions to prune the tree can include instructions to prune the subtrees of irrelevant content (e.g., irrelevant signifiers) utilizing a BFOS model.

A relation module 358 can include CRI that when executed by the processing resource 344 can perform a number of relation functions. The relation module 358 can determine a relation between the subset of the plurality of existing signifiers and the new signifier based on distance metrics between each. The distance metrics determined each can include a subset of the set of distance metrics determined and distance metrics determined between each of the subset of existing signifiers. In various examples, the distance metrics determined between each of the subset of existing signifiers can be previously calculated, such as during a semantics graph building process. The determined relation can include an approximate relation of the new signifier with the existing signifiers in the subset. For instance, the determined relation can represent an approximate relation of related phrases (e.g., multiple signifiers) in a cluster of signifiers.

A memory resource 348, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 348 can be integral, or communicatively coupled, to a computing device, in a wired and/or a wireless manner. For example, the memory resource 348 can be an internal memory, a portable memory, a portable disk, or a memory associated with another computing resource (e.g., enabling CRIs to be transferred and/or executed across a network such as the Internet).

The memory resource 348 can be in communication with the processing resource 344 via a communication path 346. The communication path 346 can be local or remote to a machine (e.g., a computing device) associated with the processing resource 344. Examples of a local communication path 346 can include an electronic bus internal to a machine (e.g., a computing device) where the memory resource 348 is one of volatile, non-volatile, fixed, and/or removable storage medium in communication with the processing resource 344 via the electronic bus.

The communication path 346 can be such that the memory resource 348 is remote from the processing resource (e.g., 344), such as in a network connection between the memory resource 328 and the processing resource (e.g., 344). That is, the communication path 346 can be a network connection. Examples of such a network connection can include a local area network (LAN), wide area network (WAN), personal area network (PAN), and the Internet, among others. In such examples, the memory resource 348 can be associated with a first computing device and the processing resource 344 can be associated with a second computing device (e.g., a Java® server). For example, a processing resource 344 can be in communication with a memory resource 348, wherein the memory resource 348 includes a set of instructions and wherein the processing resource 344 is designed to carry out the set of instructions.

The processing resource 344 coupled to the memory resource 348 can execute CRI to identify a new signifier associated with content on an enterprise network. The processing resource 344 coupled to the memory resource 348 can also execute CRI to determine a set of distance metrics between the new signifier and each of a plurality of existing signifiers. The processing resource 344 coupled to the memory resource 348 can also execute CRI to identify a cost function to analyze a relation between the plurality of existing signifiers and the new signifier. The processing resource 344 coupled to the memory resource 348 can also execute CRI to identify a subset of the plurality of existing signifiers to analyze based on the set of distance metrics and the cost function utilizing a data tree model. The processing resource 344 coupled to the memory resource 348 can also execute CRI to determine a relation between the subset of the plurality of existing signifiers and the new signifier based a distance metric between each.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method comprising:
   determining a set of distance metrics between a first signifier and each of a plurality of second signifiers acquired from unstructured content residing on different domains in an enterprise communications network;
   identifying a subset of the plurality of second signifiers to analyze based on the set of distance metrics using a computing device, wherein identifying the subset of the second signifiers comprises:
   utilizing a data tree model;
   growing a number of trees of relevant signifiers;
   splitting the number of trees into a number of subtrees; and
   pruning the number of subtrees to include the subset of the second signifiers to analyze with a cost function that is an increasing convex function satisfying Jensen's inequality;
   analyzing just the subset of the second signifiers of the existing signifiers, including determining a relation between the second subset of the existing signifiers and the first signifier based on a subset of the plurality of distance metrics, wherein analysis of just the subset of the second signifiers reduces analysis time in determining the relation of the first signifier; and identifying content in the enterprise communication network based upon the determining of the relation between the subset of the plurality of second signifiers and the first signifier.

2. The method of claim 1, wherein determining the relation between the subset of the plurality of second signifiers and the first signifier comprises calculating an average of the distance metric between the first signifier and each of the subset of the second signifiers.

3. The method of claim 1, wherein pruning the number of subtrees comprises determining to terminate pruning based on a ratio of a cost function.

4. The method of claim 1, comprising crawling an enterprise network to identify the first signifier.

5. A non-transitory computer-readable medium storing a set of instructions executable by a processing resource, wherein the set of instructions can executed by the processing resource to:

determine a set of distance metrics between a new signifier and each of a plurality of existing signifiers acquired from unstructured content residing on different domains in an enterprise communications network;

determine a cost function to analyze a relation between the plurality of existing signifiers and the new signifier;

identify a first subset of the existing signifiers utilizing a data tree model;

identify a second subset of the existing signifiers to analyze based on the set of distance metrics and the cost function, wherein the second subset is a subset of the first subset, wherein identifying the subset of the second signifiers comprises:

utilizing a data tree model;
growing a number of trees of relevant signifiers;
splitting the number of trees into a number of subtrees; and
pruning the number of subtrees to include the subset of the second signifiers to analyze with a cost function that is an increasing convex function satisfying Jensen's inequality; and analyze just the subset of the second signifiers of the existing signifiers, including determining a relation between the second subset of the existing signifiers and the new signifier based on a subset of the plurality of distance metrics, wherein analysis of just the subset of the second signifiers reduces analysis time in determining the relation of the new signifier;

identify content in an enterprise communication network based upon the determining of the relation between the subset of the plurality of existing signifiers and the new signifier.

6. The medium of claim 5, wherein the second subset of the existing signifiers comprises a cluster of signifiers including the identified new signifier.

7. The medium of claim 5, wherein the instructions executable to identify the first subset comprise instructions executable to:

utilize the data tree model to split a single node data tree into subtrees; and
compare subtrees to one another utilizing a Lloyd model.

8. The medium of claim 5, wherein the instructions executable to identify the second subset comprise instructions executable to utilize the data tree model to prune the subtrees of irrelevant content utilizing a Breiman, Friedman, Olshen, and Stone (BFOS) model.

9. The medium of claim 5, wherein the instructions executable to determine a relation between the second subset of the plurality of existing signifiers and the new signifier comprise instructions executable to approximate a measurement of a relation of related phrases in a cluster, wherein the cluster includes the second subset of the plurality of existing signifiers and the new signifier.

10. A system for identifying a subset of signifiers to analyze comprising:

a processing resource; and
a memory resource communicatively coupled to the processing resource containing instructions executable by the processing resource to:

identify a new signifier associated with content on an enterprise network;

determine a set of distance metrics between the new signifier and each of a plurality of existing signifiers acquired from unstructured content residing on different domains in an enterprise communications network;

identify a cost function to analyze a relation between the plurality of existing signifiers and the new signifier;

identify a subset of the plurality of existing signifiers to analyze based on the set of distance metrics and the cost function utilizing a data tree model;

analyze just the subset of the existing signifiers, including determining a relation between the subset of the plurality of existing signifiers and the new signifier based on a distance metric between each, wherein analysis of just the subset of the existing signifiers reduces analysis time in determining the relation of the new signifier; and identify content in an enterprise communication network based upon the determining of the relation between the subset of the plurality of existing signifiers and the new signifier, wherein the instructions executable to identify the cost function comprise instructions to identify a first component of the cost function that is minimized using a Lloyd function and a second component of the cost function is an increasing convex function that satisfies Jensen's inequality.

11. The system of claim 10, wherein the instructions executable to identify the subset of the plurality of existing signifiers to analyze comprise instructions to group the plurality of existing signifiers and the new signifier into a plurality of clusters based on the cost function and the set of distance metrics utilizing a data tree model.

12. The system of claim 10, wherein the instructions executable to identify the subset of the plurality of existing signifiers to analyze comprise instructions to identify a terminal node in a data tree structure that the new signifier belongs to.

13. The system of claim 10, wherein the instructions executable to determine the relations between the subset of the plurality of existing signifiers and the new signifier comprise instructions to approximate the relation of the new signifier with the existing signifiers in the subset.

14. The method of claim 1, wherein the set of distance metrics comprise a frequency of co-occurrence of the first signifier and the second signifier.

15. The method of claim 1, wherein the set of distance metrics comprise a metric based upon a proximity of the first signifier to the second signifier.

16. The method of claim 1, wherein the content comprises unstructured content.

17. The method of claim 1, wherein the set of distance metrics comprises a metric calculated by calculating a weighted Euclidean distance including constructing in an-dimensional feature vector, the Euclidean distance comprising an ordinary distance between two points.

18. The medium of claim 5, wherein the enterprise communication network comprises unstructured content from which the content is identified and wherein the set of distance metrics comprise a metric selected from a group of metrics consisting of: a frequency of co-occurrence of each of the existing signifiers and the new signifier; and a proximity of each of the existing signifiers to the new signifier.

\* \* \* \* \*